United States Patent
Lu

(10) Patent No.: US 7,447,179 B2
(45) Date of Patent: Nov. 4, 2008

(54) METHODS FOR SYNCHRONIZING IN A WIDE BAND CODE DIVISION MULTIPLE ACCESS COMMUNICATION SYSTEM

(75) Inventor: Jianmin Lu, Guangdong (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 567 days.

(21) Appl. No.: 10/499,033

(22) PCT Filed: Apr. 8, 2002

(86) PCT No.: PCT/CN02/00245

§ 371 (c)(1),
(2), (4) Date: Jun. 18, 2004

(87) PCT Pub. No.: WO03/056733

PCT Pub. Date: Jul. 10, 2003

(65) Prior Publication Data

US 2005/0117547 A1    Jun. 2, 2005

(30) Foreign Application Priority Data

Dec. 21, 2001  (CN)  ................. 01 1 44637

(51) Int. Cl.
    *H04B 7/216*  (2006.01)
(52) U.S. Cl. .................. 370/335; 370/324; 370/350; 455/13.2; 455/434; 455/435.1; 455/435.2; 455/502; 455/503
(58) Field of Classification Search ............. 370/350, 370/324, 335; 455/502, 503, 13.2, 434, 435.1, 455/435.2
See application file for complete search history.

(56) References Cited

U.S. PATENT DOCUMENTS 6,178,164 B1 *  1/2001  Wang et al. ............ 370/331

(Continued)

FOREIGN PATENT DOCUMENTS

WO    WO 0055992 A1    9/2000

(Continued)

OTHER PUBLICATIONS

Universal Mobile Telecommunications System (UMTS); Synchronization in UTRAN Stage 2 (3GPP TS 25.402 version 3.6.0 Release 1999); ETSI TS 125 402, ETSI Standards, European Telecommunications Standards Institute, Sophia-Antipo, FR, vol. 3-R3, No. V360, Jun. 2001, XP014008853; ISSN 0000-0001, paragraph '6.1.2.2!' figures 1,6,15*; p. 17, line 10-line 11* p. 17, line 15-line 20* paragraph '8.2.2!* relevant to claims 1, 2, 16.

(Continued)

*Primary Examiner*—Stephen M D'Agosta
(74) *Attorney, Agent, or Firm*—Baker & Hostetler LLP

(57) ABSTRACT

The invention discloses a method that implements synchronization for a WCDMA system. The method introduces a globe synchronization time to the WCDMA system as a reference time for signal transmitting of all NodeBs; when searching adjacent cells or making handover, each UE takes this reference time as a reference time; in this way, the UE design complexity is reduced, the UE available time is increased, the handover signaling is simplified and the handover success and reliability are increased too. Therefore, the method increases system capacity and makes service quality better.

12 Claims, 1 Drawing Sheet

U.S. PATENT DOCUMENTS

| | | | |
|---|---|---|---|
| 6,526,039 B1 * | 2/2003 | Dahlman et al. | 370/350 |
| 6,741,578 B1 * | 5/2004 | Moon et al. | 370/335 |
| 6,775,242 B2 * | 8/2004 | Grilli et al. | 370/252 |
| 7,024,194 B1 * | 4/2006 | Oksanen | 455/437 |
| 7,120,132 B2 * | 10/2006 | Choi et al. | 370/324 |
| 7,142,878 B1 * | 11/2006 | Barroso et al. | 455/456.6 |
| 2001/0039192 A1 * | 11/2001 | Osterling et al. | 455/502 |
| 2002/0045448 A1 * | 4/2002 | Park et al. | 455/436 |
| 2002/0048315 A1 * | 4/2002 | Hanada et al. | 375/145 |
| 2002/0051431 A1 * | 5/2002 | Choi et al. | 370/331 |
| 2002/0055357 A1 * | 5/2002 | Hanada et al. | 455/422 |
| 2002/0093940 A1 * | 7/2002 | Toskala et al. | 370/350 |
| 2002/0115464 A1 * | 8/2002 | Hwang et al. | 455/522 |
| 2003/0007471 A1 * | 1/2003 | Terasawa et al. | 370/335 |
| 2003/0091022 A1 * | 5/2003 | Blanz et al. | 370/350 |
| 2005/0080561 A1 * | 4/2005 | Abraham et al. | 701/213 |

FOREIGN PATENT DOCUMENTS

| | | |
|---|---|---|
| WO | WO 0067399 A1 | 11/2000 |
| WO | WO 0135564 A2 | 5/2001 |

OTHER PUBLICATIONS

Siemens: "Compressed Mode for seamless Hard Handover" TSG-RAN Working Group 1 Meeting #11, 'Online! Feb. 29, 2000-Mar. 3, 2000 pp. 1-5, XP 002339596, San Diego USA, retrieved from the Internet: URL:http://www.3gpp.org/ftp/TSG_RAN/WG1_RL1/TSGR1_11/Docs/Zips/R1-00-0305.zip> 'retrieved on Aug. 9, 2005! *paragraph '4.3.2!* *p. 1, paragraph 3* relevant to claims 3 and 6-13.

"TS 25.231 V0.3.0 (Jun. 1999); Technical Specification; $3^{rd}$ Generation Partnership Project (3GPP); Technical Specification Group (TSG) Radio Access Network (RAN); Working Group 1 (WG1); Physical layer- Measurements"; $3^{rd}$ Generation Partnership Project (3GPP); Technical Specification Group (TSG) Radio Access Network (RAN); Working Group 1 (WG1); Physical Layer—Measurements, Jun. 2001, XP002127381 *paragraph '5.1.1.2.1!* *paragraph '5.1.1.2.1.2!* relevant to claims 4, 5, 14 and 15.

* cited by examiner

METHODS FOR SYNCHRONIZING IN A WIDE BAND CODE DIVISION MULTIPLE ACCESS COMMUNICATION SYSTEM

FIELD OF THE TECHNOLOGY

The present invention generally relates to synchronization technique of a Wideband Code Division Multiple Access (WCDMA) system, especially to implementation method that takes the Global Synchronization time as the standard reference time for transmission of all base stations in a WCDMA system.

BACKGROUND OF THE INVENTION

Since 1980s the CDMA technique has been used in a digital mobile communication field and becomes a vital mobile communication mode with the high spectrum availability and powerful anti-interference capability. At present, people pay more attention on the third generation mobile communication system and have done a lot of work on it such as Future Public Land Mobile Telecommunication System, i.e. IMT-2000 or Universal Mobile Telecommunication System (UMTS). It is a common sense that the CDMA techniques will be deployed on the third generation communication system. Among the CDMA techniques the WCDMA is an important air interface scheme and is greatly concerned.

In the present WCDMA protocol, each cell has its own clock, but there is no unique reference time among cells. Therefore, relative timing relationship of different channels in a cell is definite, but timing relationship among cells is unknown. This means that every channel within a NodeB is synchronous, but channels among different NodeBs are asynchronous. In other words, User Equipment (UE) knows timing of the signals in its own cell but does not know any timing information about other cells. Problems arise in this situation.

1) Timing drift among different NodeBs for a long time may cause overlaps of downlink synchronization channels so that the downlink synchronization channels are unable to be differentiated, and the UE is impossible to find a adjacent cell so that a handover can not be made. Since the UE has no timing information of other cells, it is necessary to search the adjacent cells in all phases; the result is that resource is wasted, design is more difficult and at the same time power consumption of the UE is great so that its await time is shorten.

2) During soft handover, the UE must measure the arriving time differences of the signals from adjacent cells in order to ensure that delay-time of the downlink traffic channels among cells in active sets are minimum to take advantage for combination. Nevertheless, asynchronies among cells make the UE more complicated; the arriving time of multipath signals is difficult to be measured accurately and is varied as propagation environment. After the UE has reported upward the arriving time differences of signals from different cells, the target NodeB making soft handover must adjust the transmitting moment of the downlink traffic channel to obtain a minimum delay-time difference for the traffic channels. For supporting the soft handover and downlink transmitting moment adjustment, a complicated signaling procedure must be introduced; this not only increases the communication between Radio Network Controller (RNC) and NodeB, but also decreases the handover speed, success and reliability, which affect the system capacity and service quality.

SUMMARY OF THE INVENTION

Based on what has mentioned above, objective of the invention is to provide a method that implements synchronization of cells in a WCDMA system. With this method, synchronization is kept among every NodeB of the system; so difficulty of UE design is decreased, await time of the UE is increased, signaling procedure of handover is simplified and the success and reliability of handover is increased; all of these will improve system capacity and service quality level.

For above objective, the invention implements with the following technical scheme:

A method for searching a base station in a WCDMA system, comprises, receiving by a User Equipment (UE) from a current base station, a common parameters message including at least a cell time-offset of the current base station, a cell time-offset of a neighbor base station and a CPICH primary scrambling code of the neighbor base station; calculating, by the UE, arrival moment of a CPICH frame of the neighbor base station according to the common parameters message, and searching, by the UE, the neighbor base station according to the arrival moment; wherein the cell time-offsets are configured by referring to a global synchronization time when the WCDMA system is constructed. The global synchronization time is an even second moment of Global Positioning System (GPS).

The cell time-offset equals a minimum delay-time between starting moment of the downlink CPICH frame of the said cell and the reference time, which is an integer multiple of 256 chips. The integer is from 0 to 149.

For more than one adjacent cell, the common parameters message includes the cell time-offsets and the CPICH primary scrambling code respectively corresponding to each adjacent cell to the UE by the current cell NodeB.

For more than one adjacent cells, more than one common parameters message are transmitted to the UE, wherein each of the common parameters message includes a cell time-offset and the CPICH primary scrambling code of one adjacent cell respectively, and the number of the transmitted common parameters message equals to number of the adjacent cells.

The method further comprises, when establishing a Dedicated Physical Channel (DPCH), transmitting a second common parameters message including at least a DPCH time-offset to the UE by the current cell NobeB, calculating a DPCH frame arrival moment according to the second common parameters message and searching the DPCH at the time that near the computed arrival moment by the said UE.

The DPCH time-offset equals the minimum delay-time between a starting moment of the DPCH frame and the global synchronization time, which is an integer multiple of 256 chips and is allocated to the base station by the BSC. The integer is from 0 to 149.

The method further comprises, if the neighbor base station and the current base station have different frequencies, sending by the current base station a different-frequency common parameters message in a DPCH of the current cell to the UE, wherein the different frequency common parameters message at least comprises the cell time-offset, the CPICH primary scrambling code and a frequency of the neighbor base station.

The method further comprises, when the UE makes a soft handover, setting a starting moment of a DPCH frame in a target cell same as starting moment of a DPCH frame in a source cell.

Calculating, by the UE, arrival moment of a CPICH frame of the neighbor base station according to the common parameters message comprises:

calculating the global synchronization time according to the cell time-offset of the current base station; and calculating the arrival moment of a CPICH frame of the neighbor base station according to the cell time-offset of the neighbor base station and the global synchronization time.

It can be seen from the mention above that the key of the invention is that a synchronization mechanism is introduced in the WCDMA system, i.e. a standard reference time that ensures synchronization of transmitting moment of all NodeBs is introduced to the WCDMA system.

The advantages and features of the invention are as follow.

1) In the WCDMA system, every adjacent cell NodeB is synchronized to the GPS time signal; time-offset can be defined through the network planning, i.e. through taking account of various facts relating to cells in the wireless cellular communication system, so transmitting overlap of the Synchronization Channel (SCH) and CPICH is avoided.

2) Through the transmitted common parameter message, the UE knows the timing relationship and scrambling code of the current cell, the adjacent cell or the adjacent cell with different frequency; so during searching the adjacent cell, the UE needs only to search near a defined moment and only uses the scrambling code to search directly on the CPICH; in this way, the searching procedure is simplified, the searching time is shorter, and the UE design complexity is reduced, power consumption of the UE is reduced so that its await time is increased. The service quality is guaranteed.

3) During soft handover, when defining the transmitting moment of the downlink DPCH of a target cell, the DPCH time-offset of the user in the source cell may be used directly, and there is no necessary to measure the downlink propagation delay-time of signals from different base stations; during hard handover, the rough relationship of the transmitting moment and scrambling code of the source cell and the target cell is known, so the handover procedure can be speeded up so that handover success and reliability of handover is increased and the service quality is improved.

4) Through measurement the UE knows the arriving time difference of signals from the two cells, and the difference of these two arriving time differences is the propagation delay-time difference from their NodeBs to the UE since CPICH frame transmitting moments of the two cells are known, i.e. the transmitting time difference between them is known; so with this difference, distances difference from NodeBs of the two cells to the UE can be computed. Suppose there are three cell NodeBs, the UE can know the distances between any two NodeBs with the same way, so accurate position of the UE is obtained. It is seen that synchronization between base stations makes advantage for mobile station positioning.

EMBODIMENTS OF THE INVENTION

Figure 1:
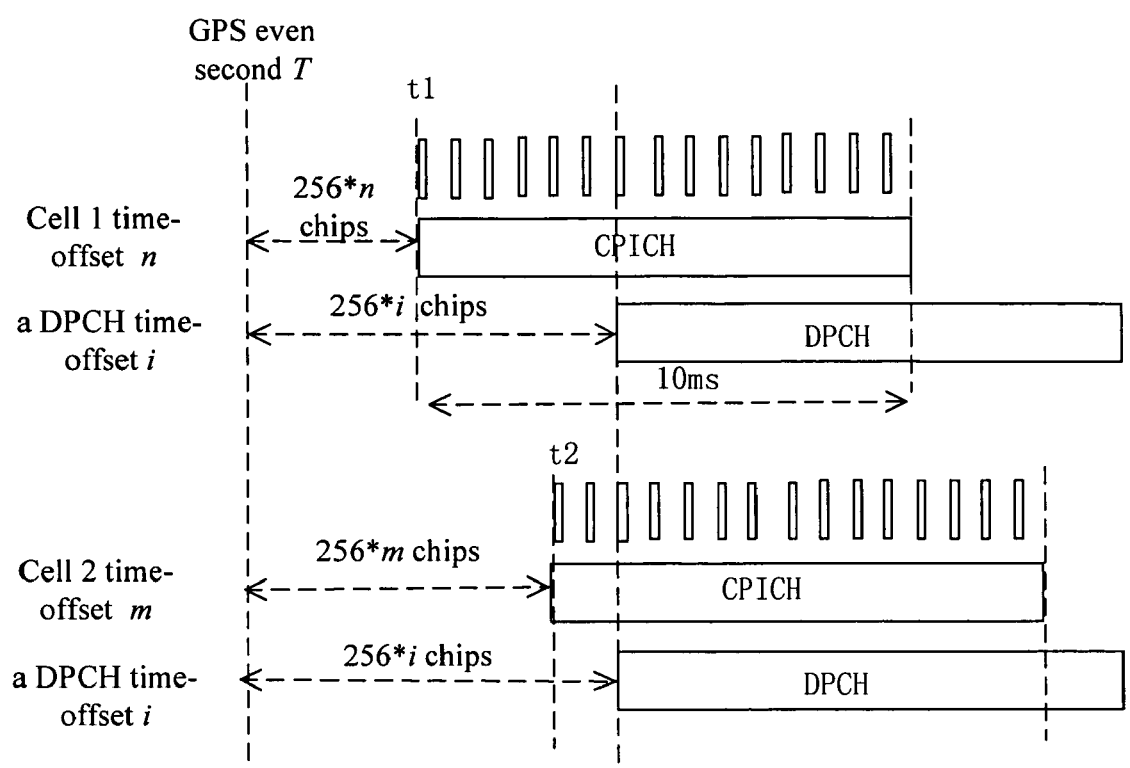
FIG. 1 shows the timing diagram of each channel for different cells of the invention in the WCDMA system.

The invention will be described in more detail with reference to the drawing and embodiment.

In this invention, a time signal of the Global Position System (GPS) or similar time signal of global synchronization are introduced as the standard reference time in the WCDMA system in order to synchronize time signals of all base stations. In this embodiment, the GPS even second moment is taken as the standard reference time.

Timing relationship of the cell in the WCDMA system is shown in FIG. 1 after the synchronization has been introduced; all the time measure position is defined at an antenna connector of the NodeB. Timing relationship of channels in a same cell is unchanged, which is consistent with the WCDMA protocol; transmitting moment of every cell takes the introduced reference time, and relating to the standard reference time, starting moment for CPICH frame of each cell is offset. It is defined that a cell time-offset, which is an integer multiple of 256 chips, is the minimum delay-time between the downlink CPICH frame starting moment and the GPS even second moment; the cell time-offset is obtained from the network planning and is allocated to the NodeB by the BSC. In FIG. 1, for example, Cell 1 has a time-offset of 256*n chips, where n is an integer on [0 . . . 149], and this means that the starting moment of CPICH frame in Cell 1 has a minimum delay-time of 256*n chips from the GPS even second moment; Cell 2 has a time-offset of 256*m chips, where m is an integer on [0 . . . 149], and this means that the starting moment of CPICH frame in Cell 2 has a minimum delay-time of 256*m chips from the GPS even second moment. In order to avoid SCHs of adjacent NodeBs overlapping, it is better to select a larger difference of time-offset among adjacent cells, i.e. m is not equal to n and has a larger difference; it is suggested that time-offset difference among adjacent cells is greater than 2*256 chips. What said network planning is to plan the time-offset of a wireless cellular communication system according to certain rules based on systemization of various parameters, such as geographical location, size and shape of the cells and overlap area etc.

Similarly, a DPCH time-offset, which is an integer multiple of 256 chips and set by upper layer, is the minimum delay-time of the downlink DPCH frame starting moment that is relative to the GPS even second moment. As shown in FIG. 1, in Cell 1 the downlink DPCH time-offset is 256*i chips, where i is an integer on [0 . . . 149]; this means that the minimum delay-time of the DPCH frame starting moment is 256*i chips. The cell time-offset and DPCH time-offset must be kept within a tolerance to avoid time drift for a long period. In general, the tolerance is less than 3 ms. Timing relationships of other channels are in accordance with the WCDMA protocol.

After the cell time-offsets have been defined, the common parameters message is transmitted down to the UE through the downlink common channel in each cell by the NodeBs; the parameters include mainly the cell time-offset of the current cell, the cell time-offsets and the CPICH primary scrambling codes of adjacent cells. The common parameters message is transmitted circularly; and the circular interval will be defined. The said adjacent cells are the cells that affect the current cell signal and may not be geographically adjacent cells. The common parameters message of every adjacent cell must be transmitted down in the current cell; the NodeB may transmit the cell time-offsets and CPICH primary scrambling codes of all adjacent cells with one message, or in the CPICH with several messages respectively.

After having received the common parameters message, the UE searches the adjacent cell with the parameters and the procedure can be explained with reference to FIG. 1. When Cell 1 is the current cell of the UE, the UE obtains Cell 1 time-offset n, Cell 2 time-offset m and CPICH primary scrambling code of Cell 2, from the Cell 1 downlink common parameter message. Without taking into account propagation delay-time from the NodeB to the UE, the UE will deduce the reference time of the GPS even second moment T according to the arrival moment t1 of the Cell 1 signal and Cell 1 time-offset of 256*n chips; the reference time T plus Cell 2 time-offset of 256*m chips are the arrival moment t2 of the CPICH frame of the adjacent cell, Cell 2. When taking into account propagation delay-time, t2 is only an approximate arrival moment of the CPICH frame in the Cell 2, since propagation delay-time for different UE may be different; in this case, when the UE searches the adjacent cell, it is needed to search some phases near moment t2, but not all the phases. Furthermore, since the UE knows the CPICH primary scrambling code of the adjacent cell by the common parameters message, the searching may be taken directly on the CPICH. In this way, the searching adjacent cell procedure is greatly simplified.

If there are adjacent cells with different frequency, a different frequency common parameter message is transmitted down to the UE through the downlink common channel in the current cell, including the frequency, the all time-offsets and the CPICH primary scrambling codes of the adjacent cells with different frequency. Then, when the UE searches the adjacent cell with different frequency, it is unnecessary to search all phases and to take the complicated initial access procedure, but only makes the primary scrambling code matching directly on the CPICH near a known phases. The searching procedure of the adjacent cell with different frequency is same as the searching procedure of the adjacent cell with same frequency except that the searching is at a time interval of compression mode and at a different frequency. Therefore, the hard handover speed is greatly increased and the service quality is improved.

When establishing the DPCH of the UE, the NodeB of the current cell allocates its DPCH time-offset i and sends messages to the UE; then according to the parameters involved in the messages, the UE computes an arrival moment of the DPCH frame and searches the DPCH near the arrival moment.

When a soft handover condition is satisfied, the RNC will designate the soft handover. Since the starting moment of the DPCH frame for the UE at the source cell is known, in general it is enough to set the same DPCH frame starting moment at the target cell. As shown in FIG. 1, suppose the UE in Cell 1 has DPCH time-offset of 256*i chips, and the UE will make soft handover to Cell 2; when establishing the downlink DPCH in Cell 2, it is enough to allocate the DPCH time-offset with same 256*i chips. In this case, the downlink DPCHs of the two cells, Cell 1 and Cell 2, are transmitted from their NodeBs synchronously, and arrive at the UE spending its own propagation time respectively; the arriving time difference at the UE equals the propagation delay-time difference from the two NodeBs to the UE. Since usually the soft handover is happened in adjacent cells and the propagation delay-time difference of these adjacent cells are usually within the combination allowance, such as within 128 chips, it is unnecessary to make any adjustment, i.e. without any adjustment the downlink of different NodeBs will be combined correctly in soft handover procedure; even the propagation delay-time differences are great, they can be compensated by allocating the DPCH time-offset of the target cell through the network planning. Therefore, it is unnecessary to make accurate measurement arriving time differences of the signals from cells for synchronization; this simplifies the handover procedure, reduces a lot of higher layer signaling, reduces system load and increases handover success and reliability.

In the hard handover, the similar synchronization mechanism mentioned above can also be used to reduce the handover complexity and increase the hard handover success and reliability.

The invention claimed is:

1. A method for searching a base station in a Wideband Code Division Multiple Access (WCDMA) system, comprising:
   receiving, by a User Equipment (UE) from a current base station, a common parameters message including at least a cell time-offset of the current base station, a cell time-offset of a neighbor base station and a CPICH primary scrambling code of the neighbor base station;
   calculating, by the UE, arrival moment of a CPICH frame of the neighbor base station according to the common parameters message, and
   searching, by the UE, the neighbor base station according to the arrival moment;
   wherein the cell time-offset of the current base station equals to a minimum delay-time between a starting moment of the CPICH frame of the current base station and a global synchronization time, and the cell time-offset of the neighbor base station equals to a minimum delay-time between a starting moment of the CPICH frame of the neighbor base station and the global synchronization time, and cell time-offsets are configured by referring to a global synchronization time when the WCDMA system is constructed.

2. The method according to claim 1, wherein the global synchronization time is an even second moment of Global Positioning System (GPS).

3. The method according to claim 1, wherein the cell time-offset is an integer multiple of 256 chips.

4. The method according to claim 3, the integer is from 0 to 149.

5. The method according to claim 1, wherein if there are more than one neighbor base station, the common parameters message comprises the cell time-offsets and the CPICH primary scrambling code respectively corresponding to the neighbor base station.

6. The method according to claim 1, wherein if there are more than one neighbor base station, receiving by the UE more than one common parameters message each of the common parameters message comprises a cell time-offset and a CPICH scrambling code of a neighbor base station, and the number of the common parameters message equals the number of the neighbor base station.

7. The method according to claim 1, further comprising when establishing a Dedicated Physical Channel (DPCH), receiving by the UE from the current base station a second common parameters message including at least a DPCH time-offset,
   calculating by the UE, a DPCH frame arrival moment according to the second common parameters message, and
   searching the DPCH frames near the computed arrival moment by the UE.

8. The method according to claim 7, wherein the DPCH time-offset equals the minimum delay-time between a starting moment of the DPCH frame and the global synchronization time, which is an integer multiple of 256 chips and is allocated to the base station by the BSC.

9. The method according to claim 8, the integer is from 0 to 149.

10. The method according to claim 1, further comprising:
    if the neighbor base station and the current base station have different frequencies, sending by the current base station a different-frequency common parameters message in a DPCH of the current base station to the UE wherein the different-frequency common parameters message at least comprises the cell time-offset, the CPICH primary scrambling code and a frequency of the neighbor base station.

11. The method according to claim 1, further comprising when the UE makes a soft handover, setting a starting moment of a DPCH frame in a target cell same as a starting moment of a DPCH frame in a source cell.

12. The method according to claim 1, wherein calculating by the UE, arrival moment of a CPICH frame of the neighbor base station according to the common parameters message comprises:
    calculating the global synchronization time according to the cell time-offset of the current base station; and
    calculating the arrival moment of a CPICH frame of the neighbor base station according to the cell time-offset of the neighbor base station and the global synchronization time.

* * * * *